United States Patent
Arzur et al.

(10) Patent No.: US 8,185,607 B1
(45) Date of Patent: May 22, 2012

(54) QUERYING WIRELESS NETWORK OFFERINGS

(75) Inventors: Erwan Arzur, Saint Julien le Faucon (FR); Michael A. Brown, Ashburn, VA (US); Timothy Clemison, Lincs (GB); Johan Montelius, Bromma (SE)

(73) Assignee: comScore, Inc., Reston, VA (US)

( * ) Notice: Subject to any disclaimer, the term of this patent is extended or adjusted under 35 U.S.C. 154(b) by 382 days.

(21) Appl. No.: 12/240,456

(22) Filed: Sep. 29, 2008

Related U.S. Application Data

(63) Continuation-in-part of application No. 11/452,646, filed on Jun. 14, 2006.

(60) Provisional application No. 60/995,750, filed on Sep. 27, 2007.

(51) Int. Cl.
*G06F 15/16* (2006.01)
(52) U.S. Cl. .......... 709/217; 709/203; 709/246
(58) Field of Classification Search ........... 709/203, 709/217, 246
See application file for complete search history.

(56) References Cited

U.S. PATENT DOCUMENTS

| | | | |
|---|---|---|---|
| 6,738,808 B1 | 5/2004 | Zellner et al. | |
| 6,961,776 B1 * | 11/2005 | Buckingham et al. | 709/229 |
| 7,025,209 B2 * | 4/2006 | Hawkins | 209/217 |
| 7,072,934 B2 * | 7/2006 | Helgeson et al. | 709/203 |
| 7,177,938 B2 | 2/2007 | Sanders | |
| 7,415,537 B1 * | 8/2008 | Maes | 709/246 |
| 7,539,766 B1 * | 5/2009 | Strong et al. | 709/230 |
| 7,617,525 B1 * | 11/2009 | Moeck et al. | 726/11 |
| 7,801,945 B1 * | 9/2010 | Geddes et al. | 709/203 |
| 2002/0023147 A1 * | 2/2002 | Kovacs et al. | 709/219 |
| 2002/0073236 A1 * | 6/2002 | Helgeson et al. | 709/246 |
| 2002/0091843 A1 * | 7/2002 | Vaid | 709/230 |
| 2004/0117248 A1 | 6/2004 | Dutta et al. | |
| 2004/0205198 A1 * | 10/2004 | Zellner et al. | 709/228 |
| 2005/0021860 A1 * | 1/2005 | Kelly et al. | 709/246 |
| 2006/0020716 A1 * | 1/2006 | Suryanarayana | 709/248 |
| 2006/0069746 A1 * | 3/2006 | Davis et al. | 709/218 |
| 2006/0112167 A1 * | 5/2006 | Steele et al. | 709/206 |
| 2006/0271642 A1 * | 11/2006 | Stavrakos et al. | 709/217 |
| 2008/0214156 A1 | 9/2008 | Ramer et al. | |
| 2008/0280644 A1 * | 11/2008 | Hugot | 455/556.2 |

OTHER PUBLICATIONS

Non-Final Office Action for U.S. Appl. No. 12/361,466 mailed Apr. 1, 2011 (16 pages).
Non-Final Office Action for U.S. Appl. No. 11/452,646 mailed Jan. 27, 2009 (8 pages).
Final Office Action for U.S. Appl. No. 11/452,646 mailed Jul. 24, 2009 (9 pages).

* cited by examiner

*Primary Examiner* — Phuoc Nguyen
(74) *Attorney, Agent, or Firm* — Fish & Richardson P.C.

(57) ABSTRACT

A request is received at an emulation system configured to communicate over a wireless network. The request indicates content to be retrieved from over the wireless network. A content request for the content to be retrieved over the wireless network is generated at the emulation system. The content request emulates a content request from a particular wireless device. The generated content request is sent from the emulation system over the wireless network to a server that is configured to retrieve the content and return the content to the emulation system. The content is received at the emulation system from the wireless network in a first format. The content is converted from the first format to a second, different format to generate converted content.

48 Claims, 5 Drawing Sheets

QUERYING WIRELESS NETWORK OFFERINGS

CROSS-REFERENCE TO RELATED APPLICATIONS

This application claims the benefit of U.S. Provisional Application No. 60/995,750, filed Sep. 27, 2007 and titled SYSTEM AND METHOD TO QUERY WIRELESS NETWORK OFFERINGS, which is incorporated herein by reference in its entirety. This application is also a Continuation in Part (CIP) of U.S. patent application Ser. No. 11/452,646, filed Jun. 14, 2006 and titled SYSTEM AND METHOD TO QUERY WIRELESS NETWORK OFFERINGS.

TECHNICAL FIELD

This disclosure relates to surveying content made through wireless networks.

BACKGROUND

Wireless or mobile service providers, such as cell phone service providers, often make certain content available to the devices that access the provider's network. For instance, the user of a mobile phone may be able to access certain mobile webpages (e.g., written in or transcoded to wireless markup language (WML)) that are provided by the provider through the provider's mobile portal. The content provided may include, for example, games, catalog pages, video clips, sports scores, internet email, uploaded and downloaded photos, music downloads, graphics such as area maps, news stories, weather reports, and stock market information.

Content available through the mobile portal can be referred to as "on-deck" content, whereas "off-deck" content may refer to content that is available on the Internet generally. In general, the on-deck content varies from provider to provider. Some devices may only be able to access the on-deck content, while others may be able to access the on-deck and off-deck content.

The on-deck or off-deck content, or the formatting of the on-deck or off-deck content, may be adjusted to the make and model of the device used to access the content. For example, a given on-deck or off-deck webpage or other content may be modified based on the bandwidth of the particular device's connection, screen size limitations of the particular device, and/or graphical user interface (GUI) input capabilities of the particular device.

Also, wireless service providers or other content providers may also modify a webpage or other content to allow their users to use newer capabilities of newer wireless devices, while insuring that the content is suitable to older wireless devices. Desktop browsers may use the full display, memory, processing and input capabilities of a desktop computer, which can allow such browsers to easily process large and complicated file formats. On the other hand, some wireless browsers may have limitations in some or all of these capabilities. Over time, however, the browsers on wireless devices may increase in capabilities, and the wireless service providers may want to insure that the content is readily available for newer wireless browsers as well as older ones.

To accommodate such differences, a wireless service provider or other content provider may store multiple versions of a given webpage, with each version being designed for one or more particular devices. When a device requests the webpage, the appropriate version for that device is identified and returned to the device. Alternatively, or additionally, the wireless service provider or other content provider may store one version of the content, and then transcode or otherwise transform that version to a version for the particular device requesting the content before sending the requested content to the device.

SUMMARY

In one aspect, a request is received at an emulation system configured to communicate over a wireless network. The request indicates content to be retrieved from over the wireless network. A content request for the content to be retrieved over the wireless network is generated at the emulation system. The content request emulates a content request from a particular wireless device. The generated content request is sent from the emulation system over the wireless network to a server that is configured to retrieve the content and return the content to the emulation system. The content is received at the emulation system from the wireless network in a first format. The content is converted from the first format to a second, different format to generate converted content.

Implementations may include one or more of the following features. For example, generating the content request for the content to be retrieved over the wireless network may include accessing a device database to retrieve information regarding the particular device and generating the content request based on the retrieved information such that the content request includes information that would be included in a content request from the particular wireless device. The information that would be included in a content request from the particular wireless device may include one or more values for a header in the content request or User Agent Profile information. The header may include an accept header or a user agent header.

Sending the generated content request over the wireless network may include accessing a network database to retrieve information regarding the wireless network; and sending the generated content request over the wireless network based on the retrieved information.

The emulation system may include an emulation server configured as a proxy server. Receiving the request at the emulation system may include receiving the request on a port of the emulation server that corresponds to the particular device. Generating, at the emulation system, the content request may include generating the content request at the emulation server based on the port on which the request was received. The request received at the emulation server may be a content request including one or more header values and generating the content request at the emulation server may include changing the one or more header values to header values that would be in a content request from the particular wireless device.

The emulation system may include a staging server and an emulation server coupled to the staging server. Receiving the request may include receiving the request at the staging server and placing in the request in a queue. Generating the content request may include receiving the queued request at the emulation server from the staging server and generating the content request at the emulation server. Sending the generated content request over the wireless network may include sending the generated content request from the emulation server.

Receiving the request may include receiving the request at the staging server. Generating the content request may include generating the content request at the staging server and placing the content request in a queue. Sending the generated content request over the wireless network may include receiving the queued content request at the emulation server from the staging server and sending the generated content request from the emulation server.

Generating the content request at the staging server may include forming an HTTP request that includes information that would be included in a content request from the particular wireless device. Converting the content from the first format to the second, different format may include converting the content from WML to XHTML.

In another aspect, a system may include a client system, a wireless communication device configured to communicate over a wireless network, and an emulation system coupled to the wireless communication device. The emulation system is configured to receive a request from the client system, wherein the request indicates content to be retrieved from over the wireless network; generate a content request for the content to be retrieved over the wireless network, wherein the content request emulates a content request from a particular wireless device; send the generated content request over the wireless network, using the wireless communication device, to a server that is configured to retrieve the content and return the content to the emulation system; and receive the content from the wireless network, wherein the content is received at the emulation system in a first format. The emulation system or the client system is configured to convert the content from the first format to a second, different format to generate converted content.

Implementations may include one or more of the following features. For example, to generate the content request for the content to be retrieved over the wireless network, the emulation system may be configured to access a device database to retrieve information regarding the particular device; and generate the content request based on the retrieved information such that the content request includes information that would be included in a content request from the particular wireless device. The information that would be included in a content request from the particular wireless device may include one or more values for a header in the content request or User Agent Profile information. The header may include an accept header or a user agent header.

To send the generated content request over the wireless network, the emulation system may be configured to access a network database to retrieve information regarding the wireless network; and send the generated content request over the wireless network based on the retrieved information.

The emulation system may include an emulation server configured as a proxy server. The emulation server may be configured to receive the request on a port of the emulation server that corresponds to the particular device and generate the content request at the emulation server based on the port on which the request was received. The request received at the emulation server may be a content request including one or more header values and, to generate the content request, the emulation server may be configured to change the one or more header values to header values that would be in a content request from the particular wireless device.

The emulation system may include a staging server and an emulation server coupled to the staging server. The staging server may be configured to receive the request and place the request in a queue. The emulation server may be configured to receive the queued request from the staging server and generate the content request. The emulation server may be configured to send the generated content request over the wireless network using the wireless communication device.

The staging server may be configured to receive the request, generate the content request and place the content request in a queue. The emulation server may be configured to receive the queued content request from the staging server and send the generated content request over the wireless network using the wireless communication device.

To generate the content request, the staging server may be configured to form an HTTP request that includes information that would be included in a content request from the particular wireless device. The first format may be WML and the second format may be XHTML.

Implementations of the described techniques may include hardware, a method or process, or computer software on a computer-accessible medium. The details of one or more implementations are set forth in the accompanying drawings and the description below. Other features will be apparent from the description and drawings, and from the claims.

DETAILED DESCRIPTION

In one implementation, an emulation system may be used to retrieve the different versions of on-deck content made available by a wireless service provider. The emulation system can emulate different wireless devices to retrieve the versions of particular on-deck content (e.g., a webpage) for those devices. To that end, when generating a request for the particular content, the emulation system can include in the request the device identification information and/or content limitations for the device being emulated. This will result in the version of the content for the device being emulated to be returned to the emulation system. Thus, the emulation system can emulate a variety of wireless device makes and models, and retrieve the versions of the on-deck content for those emulated devices. Alternatively, or additionally, various devices may be emulated to retrieve versions off-deck content for those devices. The retrieved content then can be used in various analytics or auditing of the on-deck and/or off-deck content. For instance, the retrieved content can be evaluated to produce analytics regarding the type of content available or auditing of advertisement or other content placement.

Figure 1:
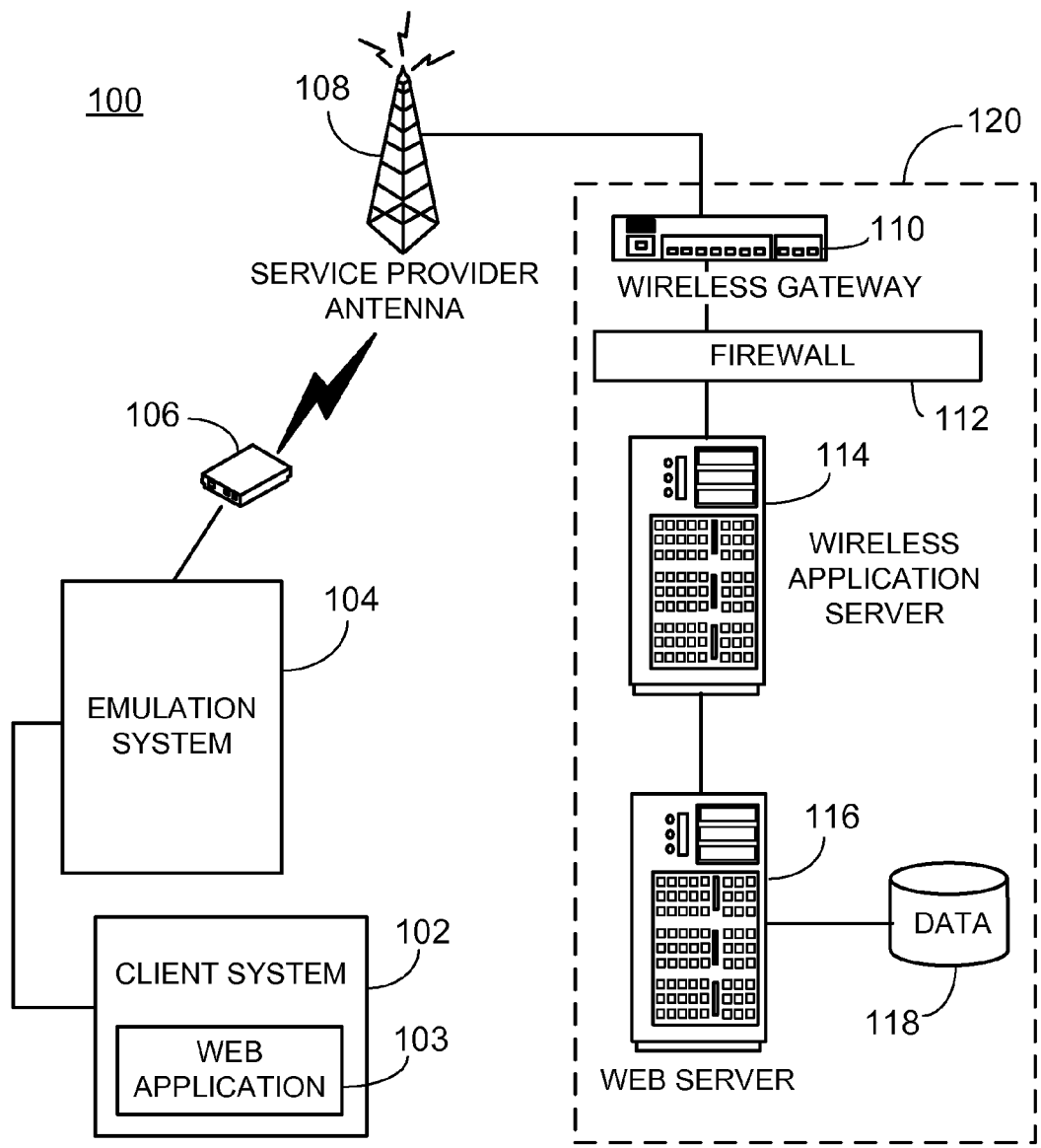
FIG. 1 illustrates an example of a system in which an emulation system can emulate a variety of wireless devices to retrieve the various versions of content for those devices.

FIG. 1 shows an example of a system 100 in which an emulation system 204 can emulate a variety of wireless devices to retrieve the various versions of content for those devices from a wireless provider's mobile portal 120. The system 100 includes the emulation system 104, which connects to a service provider antenna 108 using a wireless communication device, such as a wireless modem 106. The antenna 108 is connected to the mobile portal 120.

In system 100, mobile portal 120 is configured such that the on-deck content is in the form of webpages. However, in other implementations, the on-deck content may take other forms, such as video or audio content. In general, the mobile portal 120 receives requests for webpages from wireless devices, and returns the appropriate version of the webpage to the device. The mobile portal 120 includes a wireless gateway 110, a firewall 112, a wireless application server 114, a web server 116, and a storage 118.

The wireless gateway 110 transforms messages in the wireless protocol used in transmissions to the mobile portal 120 into messages appropriate for the network on which the rest of the mobile portal 120 is implemented (which may be, for example, TCP/IP), and vice versa. The wireless gateway may be designed to support one or more wireless service standards such as short message service (SMS), high-speed circuit switched data (CSD), general packet radio service (GPRS) and unstructured supplementary services data (USSD). The gateway 110 may be hosted by the wireless service provider, although other third party hosts are possible. The wireless gateway 110 may be designed to optimize the communication process and facilitate other wireless features such as location of the client, privacy of data. The wireless gateway 110 also may be designed to implement the WAP push protocol, which provides for the ability to send data to a wireless device without the wireless device first requesting the data.

The wireless application server 114 receives requests for webpages from the wireless gateway 110, obtains the version of the webpage appropriate to the device making the request, and returns the appropriate version to the wireless gateway 110 so that the webpage can be forwarded to the wireless device. When the wireless application server 114 receives a request for the webpage, the wireless application server 114 identifies the wireless device and browser type making the request, and/or determines the appropriate markup language, the size of the user interface, the types of graphics supported, the preferred language, and other content limitations.

The wireless application server 114 can do so using headers or other information included in the request. For instance, browsers on some wireless devices may include an HTTP_ACCEPT header in the request. This header can contain the multipurpose internet mail extension (MIME) types that the browser can accept and read. The browser also may include a HTTP_USER_AGENT, which can indicate the identity of the browser used by the wireless device, as well as make and model of the wireless device. The wireless application server 114 can query a database to match the information contained in these headers and determine, among other things, device parameters such as screen size and browser capabilities.

Another type of information that may be enclosed in the request is the User Agent Profile (UAProf), a specification established by the Open Mobile Alliance. This may be used to establish the capabilities of the wireless device making the web page request. The UAProf is embedded in the request object generated by the wireless device in the process of requesting a web page. In the wireless application protocol (WAP) 2.x specification, the UAProf is based on the Composite Capabilities/Preference Profiles (CC/PP) specification as defined by the W3C. The wireless application server 114 may use this information to determine the appropriate device parameters.

Based on the determined device parameters, the wireless application server 114 obtains an appropriate version of the webpage for the device. For instance, the wireless application server 114 may obtain an appropriate version of the webpage from web server 116 by sending an HTTP request to the web server 116 to retrieve the appropriate version, or may redirect the browser on the wireless device to the URL of the appropriate version on web server. Web server 116 retrieves the appropriate version from the storage 118 and returns the version to the wireless application server 114.

Additionally, or alternatively, one version of the webpage may be stored on web server 116. In this case, the wireless application server 110 may retrieve the webpage from the web server 116, and transcode the webpage into a version that is suitable for the device requesting the webpage.

The wireless application server 114 returns the appropriate version of the webpage to the wireless gateway 110, which forwards the version to the device. If the webpage is stored in the form of, or transcoded to, textual WML then the wireless gateway 110 may compile the textual WML into tokenized WML (WMLC). The tokenized WML is a compressed binary version of the webpage, which may be used to reduce bandwidth usage. The tokenized WML is sent back to the wireless device. An alternative to WML is XHTML MP (mobile profile). This is an extension of the hypertext markup language (HTML) that enforces the strict syntax checking of XML. With the release of the WAP 2.0 standard for wireless gateways, XHTML MP content is passed straight through to the client wireless device without binary encoding. After the wireless gateway 110 has compiled the webpage (if implemented), the wireless gateway 110 sends the webpage back to the wireless device making the request.

The system also includes a client system 102 connected to the emulation system 104. The client system 102 executes a content request application 103 that can issue requests to the emulation system 104 that specify a particular webpage to be retrieved and the particular device to be emulated when retrieving that webpage. The content request application 103 may be a web application rendered in a browser executing on the client system 102. The web application may allow a user to manually specify the particular webpage to be retrieved and the particular device to be emulated. The returned webpage may then be displayed in the web application.

Additionally, or alternatively, the content request application 103 may be an automated program that automatically requests one or more webpages for one or more devices. For instance, the content request application 103 may access a list of predefined webpages and devices to be emulated. The content request application 103 can then issue requests for each combination of webpage and device. This can be repeated one or more times for the predefined list, either periodically or aperiodically.

As another example, the content request application 103 may traverse the various webpages for one or more devices without a predefined list. For instance, the content request application 103 may request that a home page for the on-deck content be retrieved by emulating a particular wireless device, and then parse the returned web page to determine if another link is present on that page. This process can then be iterated until all the offerings of that particular wireless provider for that particular wireless device have been exhausted. The content request application 103 can then select another wireless device and perform this process again to obtain the content for that device. Additionally, or alternatively, the content request application 103 can use multiple threads to simultaneously traverse the offerings for the various wireless devices.

In response to the requests sent by the content request application 103, the emulation system 104 generates a content request for the webpage that emulates a content request from the device being emulated (e.g., by including the appropriate information in the content request for the device being emulated). For instance, the emulation system may set the headers (e.g., HTTP_ACCEPT and HTTP_USER_AGENT) in the content request consistent with those used for the device being emulated, or otherwise include information (e.g., UAProf information) in the content request that simulates a request made by the device being emulated. The emulation system 106 uses the wireless modem 106 to send the generated request to wireless gateway 110. The content request is sent wirelessly and is received by the provider's antenna 108. The request may be sent using, for example, Wireless Session Protocol (WSP) or wireless profiled HTTP, and the protocol used may depend on the device being emulated.

The returned webpage is processed by the emulation system 104 and sent back to the content request application 103. The content request application 103 can then process the webpage appropriately. For instance, if the content request application 103 is a web application, the returned web page may be displayed to a user in the web application. If the content request application 103 is an automated program, for instance, the automated program may store and log the web page for further processing.

The emulation system 104 may convert (e.g., transcode) the webpage from the format in which the webpage is received (e.g., a wireless specific format, such as WML) into another format (e.g., XHTML). This may be useful when the content request application 103 is implemented as a web application in a browser that does not support the format in which the webpage is received. For example, a desktop browser may not support formats specifically designed for wireless devices. Such a non-wireless device browser, for instance, may not be able to handle WMLC coded pages, textual WML pages, or a WAP multipart coded body. By transcoding the webpage to a format that can be handled by a non-wireless device browser may allow a standard desktop browser running on a personal computer (PC) to be used to view the returned webpage. The returned webpage may be transcoded in a way that retains the content and layout of the webpage in a manner that allows the browser to display the webpage as if the webpage was displayed on the emulated device. Transcoding also may be useful when the content request application 103 is implemented as an automated program. In this case, transcoding can insure that the returned formats are stored in a single format, which may simplify the design of any process that operate on those stored webpages because the process does not need to understand multiple formats.

Alternatively or additionally, a browser operating on the client system 102 can be chosen or designed to process the webpage in the format in which the webpage was returned. Also, portions of the returned webpage may be transcoded, with the browser being capable of processing the non-transcoded portions.

The emulation system 104 also may re-write hyperlinks in the webpage so that, when a hyperlink is selected, the resulting request is sent to emulation server 104. For instance, a user may select a hyperlink displayed in the webpage, or the browser rendering the webpage may automatically select the hyperlink to download an item, such as an image, that forms part of the webpage. This may allow a user viewing the displayed webpage on the web application to interact with the webpage in the same manner that a user could if viewing the webpage on the emulated device.

In another implementation, the client system may be configured to transcode the received webpage from the format in which the webpage is received to another format and/or re-write hyperlinks in the webpage so that, when a hyperlink is selected, the resulting request is sent to emulation server 104. For instance, the content request application 103 or another application running on the client system 102 may be configured to transcode the webpage and/or re-write hyperlinks.

While a single modem 106 is shown, multiple modems can be connected to the emulation system 104. The multiple modems may provide multiple links to a given wireless service provider, or may provide links to multiple service providers. If links are provided to multiple wireless service providers, the content request application 103 may additionally specify the particular provider, as well as the particular device and webpage. Each modem can be connected to the emulation system 104, for example, via a USB connector or similar link, such as Bluetooth®.

If multiple modems are used to provide access to multiple wireless service providers, the emulation system 104 can be multi-homed, with each wireless provider network being accessed through one or more of the modems and having independent IP sub-nets. The emulation system 104 may employ a properly configured IP routing table to insure that the appropriate modem is used to direct traffic to the correct wireless service provider network.

In addition, while a single emulation system 104 is shown, in other implementations, multiple emulation systems may be used. For instance, the emulation system 104 may employ multiple servers with connected modems, with each server deployed in a different country to provide access to the wireless service provider's network in that country. The servers can be deployed in data centers in locations where the wireless network reception is optimal. Also, while illustrated as separate systems, the client system 102 and emulation system 104 can be implemented on the same device.

The emulation system 104 can also be configured to perform wireless service provider specific domain name resolution, if needed. For instance, when a wireless gateway 110 is used, the IP address of the gateway 110 may be fixed, obviating the need for name resolution. However, in some implementations in which a gateway 110 is not used, the emulation system 104 may perform a name resolution to determine the IP address based on a host address of the appropriate wireless application server.

Furthermore, while FIG. 1 shows an implementation in which on-deck content is retrieved from a wireless provider's mobile portal 120, the system 100 may include off-deck content. For instance, the wireless gateway 110 and/or the wireless application server 114 may operate to retrieve and return off-deck content that is stored on servers of other content providers. Those other content providers also may vary their content according to the particular wireless device.

Figure 2:
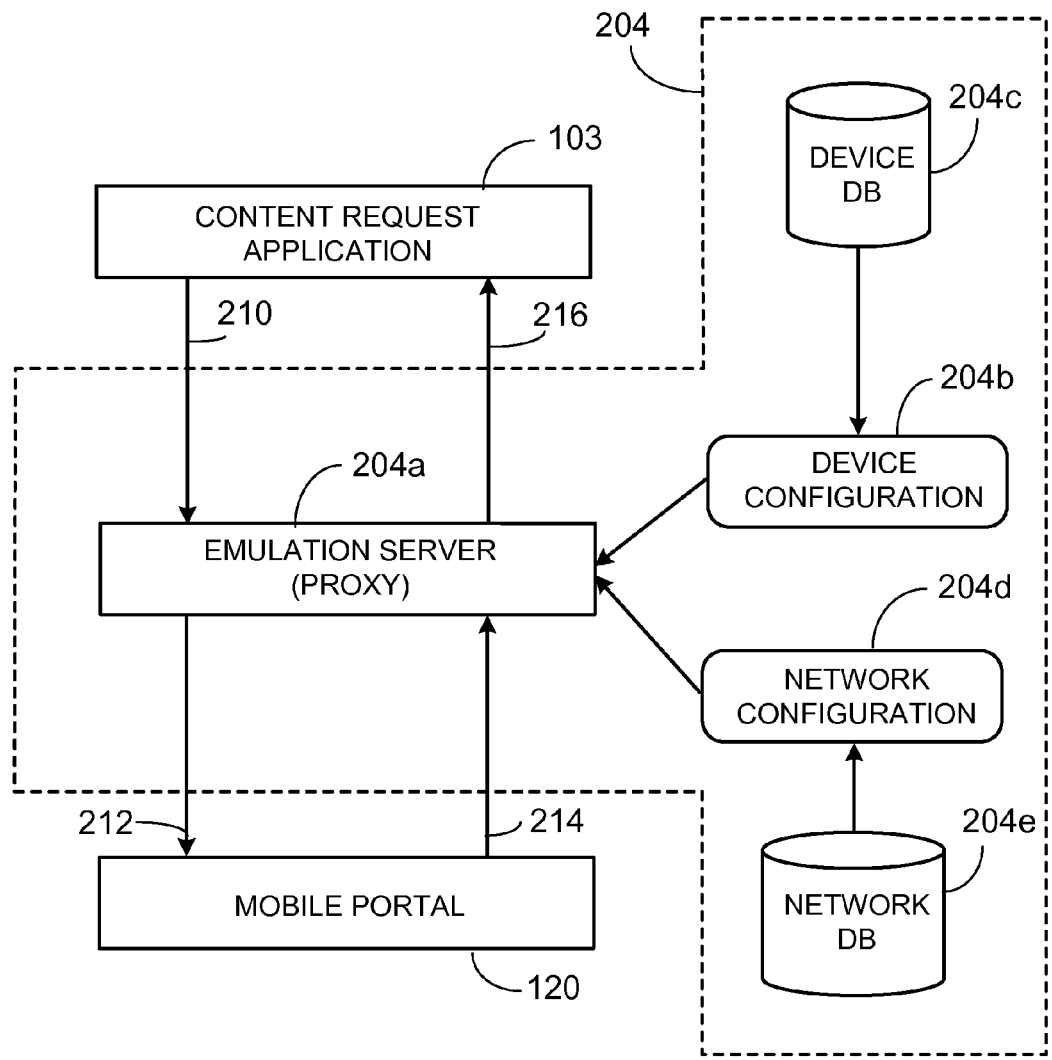
FIG. 2 illustrates an example of an implementation of an emulation system.

FIG. 2 illustrates an example of an implementation of an emulation system 204, and the resulting operational flow. The emulation system 204 includes an emulation server 204a, a device database 204c that stores one or more device configurations 204b, and a network database 204e that stores one or more network configurations 204d.

In this implementation, the content request application 103 is configured to use the emulation server 204a as an HTTP proxy. Specific TCP ports of emulation server 204a are associated with particular combinations of wireless provider and device to be emulated. To issue requests for a given wireless provider and emulated device, the content request application 103 is first configured to use the emulation server 204a as a proxy server on the TCP port corresponding to the wireless provider and emulated device. For example, when the content request application 103 is a web application, the emulation server 204a may be designed to provide a configuration webpage that provides a list of the available providers and available devices to be emulated. The configuration webpage may allow a user to choose the provider and device, and then provide the user with an appropriate URL that can be used to configure the web browser to use the emulation server 204a as a proxy on the corresponding TCP port.

After the content request application 103 is configured to use the appropriate port, the content request application 103 may issue a request 210 for a webpage. The content request application 103 may issue the request as an HTTP request specifying the URL for the webpage. For instance, when the content request application 103 is a web application, a user may be able to specify a URL of the desired webpage, which causes the browser to issue an HTTP request for the specified URL. The emulation server 204a receives the request 210 on the configured port. When the request 212 is received by the emulation server 204a, the emulation server 204a changes the headers of the request (e.g., User-Agent and Accept) or otherwise generates a content request that simulates a request from the wireless device corresponding to the configured port.

To that end, the emulation server 204a accesses the particular device's configuration 204b from the device database 204c. The device configuration 204b includes the headers and/or other information used to simulate a request from the emulated device. An example of a format for a device configuration is shown in the following table:

| z_device_profile | |
|---|---|
| device_id | database device id |
| device_name | name of the device |
| header_name | name of the header |
| header_value | value of the header |

Also, to properly send the request, the emulation server 204a accesses the particular provider's network configuration 204d from the network database. The network configuration 204d includes information about the particular network, such as the proper wireless gateway and DNS servers, which allows the emulation server to 204a to appropriately send the request on the configured provider's network. An example of a format for a network configuration is shown in the following table:

| z_carrier_profile | |
|---|---|
| carrier_id | database carrier identifier |
| carrier_name | Name of carrier |
| proxy_information | address: port string for the proxy. |
| shexp_information | comma separated list of javascript regular expressions used for generating a Proxy Autoconfiguration File |
| home | URL of the home page for this carrier |
| dns servers | comma separated list of the DNS servers to use |
| device_list | comma separated list of the device ids |

Once the content request is appropriately generated, the emulation system 102 then forwards the content request 212 to the provider's mobile portal 120 using the appropriate WAP gateway or proxy. The request 212 is transmitted to the carrier's network using the wireless modem, as described above in regards to FIG. 1.

The provider's mobile portal 120 retrieves or generates the appropriate version of the webpage for the device emulated, and returns the webpage 214 to the emulation server 204a. The emulation server 204a may then transcode or otherwise convert the returned webpage 214 from the format in which it was received to another format. For instance, the server 204a can parse and transform device specific content, such as WML as an example, into XHTML. This process can employ either a straight one-to-one transformation algorithm that is maintained on the server or an adaptive process for dynamically recognizing the aspects of the first format and determining an equivalent in the target format. Once the webpage has been transcoded, the transcoded webpage 216 is returned to the content request application 103 for display or further processing.

As described above, the emulation system 204 or other emulation systems may be located in different countries. This may result in the emulation system 204 not being located on the same network as the content request application 103. To provide security, the emulation system 204a may be connected through the Internet to the network on which the content request application 103 resides using a virtual private network (VPN). In addition, other content request applications may connect to that same network using a VPN. This may allow third parties (with respect to the entity operating the emulation system) to access and use the emulation system 204a.

Figure 3:
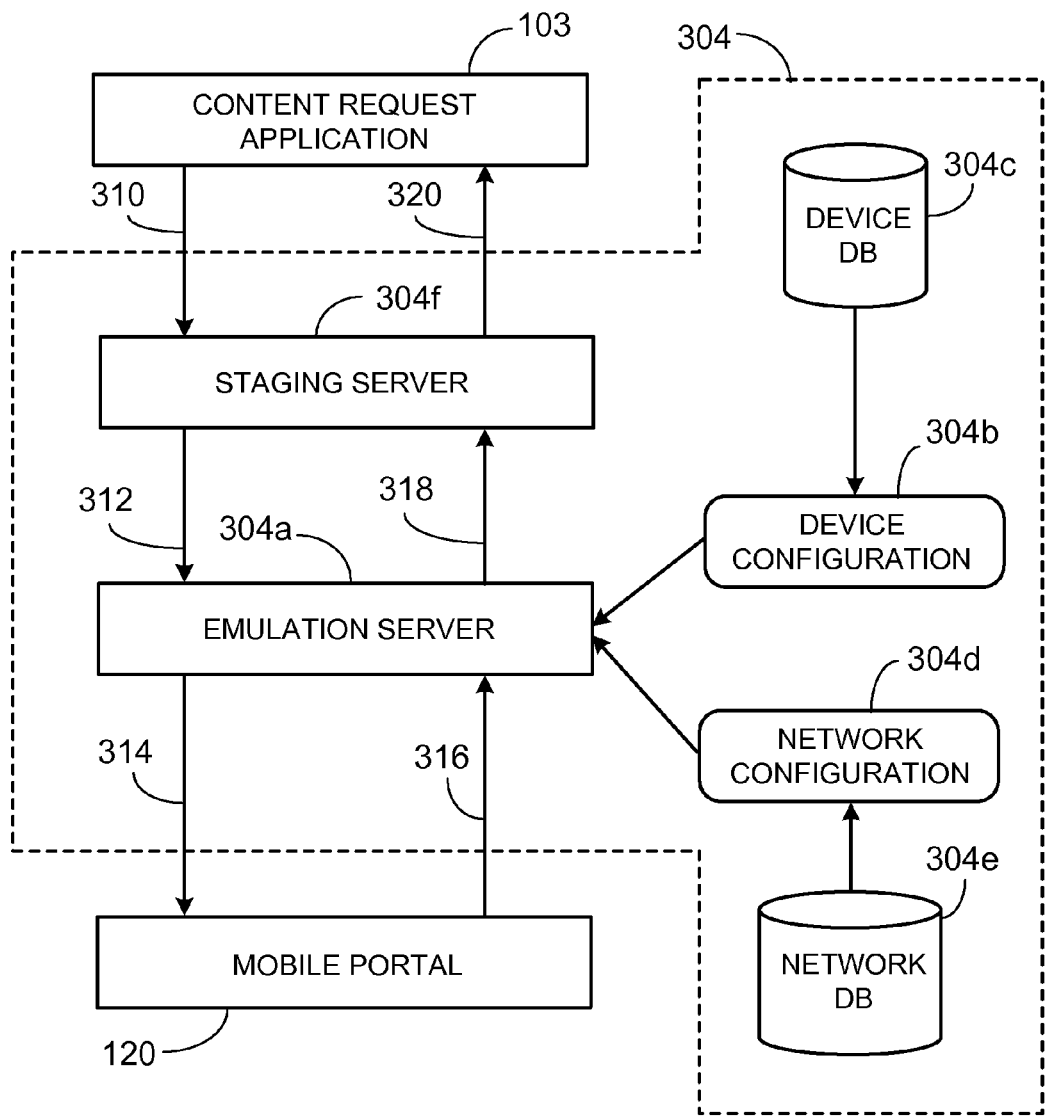
FIG. 3 illustrates an example of another implementation of an emulation system.

FIG. 3 illustrates an example of another implementation of an emulation system 304, and the resulting operational flow. The emulation system 304 includes an emulation server 304a, a staging server 304f, a device database 304c that stores one or more device configurations 304b, and a network database 304e that stores one or more network configurations 304e.

In this implementation, the staging server 304f queues requests for a given webpage, carrier, and emulated device. The emulation server 304a then retrieves a request from the staging server 304f, processes the request, and returns the result back to the staging server 304f, which returns the result to the content request application 103.

For instance, in one implementation, the staging server 304f hosts a web server to provide a web application and an XML remote procedure call (XML-RPC) server. When a user wants to manually retrieve a webpage, the user can use a browser on the client system to obtain the web application from the staging server 304f. The web application allows the user to select the provider, the device to be emulated, and the web page to be retrieved. The web application then sends a XML-RPC request 310 with this information to the staging server 304f, which then validates and queues the request. Automated programs may send XML-RPC requests directly without first requesting the web application. The queue can be operated as a simple FIFO type list or as a more complex, priority-based scheduling scheme. The staging server 304f may maintain a separate queue for each provider. An example of the parameters included in the XML-RPC request are shown in the following table:

| carrier_id | carrier identifier in network database |
|---|---|
| device_id | device identifier device database |
| request_id | a unique identifier (e.g., hash) for the request |
| request_url | url of the request |
| request_headers | headers (name-value pairs) forwarded by the client (e.g., cookie values). |

The emulation server 304a periodically or aperiodically requests the next item in the queue from the staging server 304f, which returns the next queued request 312 to the emulation server 314. Once the next queued request 312 is received, the emulation server accesses the appropriate device configuration 304b from device database 304c and network configuration 304d from network database 304e, and uses those configurations to appropriately form or otherwise generate a content request that emulates the chosen device, and sends that request 314 to the mobile portal 120 using the appropriate WAP gateway or proxy.

The provider's mobile portal 120 retrieves or generates the appropriate version of the webpage for the device emulated, and returns the webpage 316 to the emulation server 304a. The emulation server 304a then sends (e.g., using an HTTP POST or GET) a response 318 to the staging server 304f that includes the received webpage and other information. An example of the format for the response 318 is shown in the following table:

| | |
|---|---|
| request_id | The unique id corresponding to the queued request |
| response_code | HTTP response code |
| response_headers | Headers of the response |
| response_bytes | Base64 encoded version of the webpage. |

The staging server 304f transcodes or otherwise converts the received webpage from the format in which it was received to another format and converts hyperlinks to links that are directed to the staging server 304f. The staging server 304f then return the transcoded webpage to the content request application 103 as part of a response 320 to the original XML-RPC request. In an alternate implementation, the emulation server 304a transcodes the webpage and re-writes links before sending the response 318 to the staging server 304f.

To provide security, the client system 102 can communicate with the staging server 304f using a secured connection protocol, such as HTTPS. For instance, the web browser on the client system 102 may use HTTPS to request the web application from the staging server 304f and the web application may use HTTPS to send requests to and receive responses from the staging server 304f. Similarly, communications between the emulation server 304a and the staging server 304f may use secured connections, such as HTTPS connections. Authentication may be used to allow a browser or content request application to access the staging server 304f. Third parties (with respect to the entity operating the emulation system) may be allowed to access and use the emulation system 304a using a browser outside of the network on which the staging server 304f is located by authenticating to the staging server 304f and using a secured connection, such as an HTTPS connection.

In another implementation, rather than the emulation server 304a forming or otherwise generating the request based on the device configuration, the staging server 304f generates the request that emulates the selected device. To that end, the staging server 304f may receive the request 310 from the content request application 103 as described above. Instead of simply queuing the received request 310, the staging server 304f accesses the device configuration 304b for the selected device and uses that configuration to properly generate the content request that emulates the selected device (e.g., an HTTP request with the appropriate headers). The content request that emulates the selected device is then queued by the staging server 304f. The emulation server 304a then retrieves 312 the queued content request and an identifier of the selected provider from the staging server 304f, retrieves the network configuration 304d for the selected provider from the network database 304e, and then sends the request using the network configuration 304d to the mobile portal 120 using the appropriate WAP gateway or proxy. In a variation, the emulation server 304a may not access the network database 304e directly, but instead the staging server 304f is configured to directly access the network database 304e and runs a service that the emulation server 304a can query to obtain the relevant information.

In yet another implementation, multiple emulation servers are used and individual emulation servers are dedicated to a particular wireless service provider. The staging server 304f receives requests 310 from the content request application 103 and uses the device database 304c to form or otherwise generate content requests that emulate the selected devices. The staging server 304f then queues the content requests in separate queues. Each queue corresponds to one of the wireless service providers. When the emulation server for a given wireless service provider requests the next item in the queue, the next request in the queue for that wireless service provider is retrieved and sent from the staging server 304f to the emulation server 304a. Because each emulation server is configured for a particular wireless service provider, an identity of the selected wireless provider does not need be transferred to the emulation server. Rather, the emulation server can be configured such that the emulation server 304a always retrieves information for the configured wireless service provider from the network database 304e, either directly or indirectly, or such that the emulation server 304a locally stores and uses the network configuration for the configured wireless service provider.

Figure 4A:
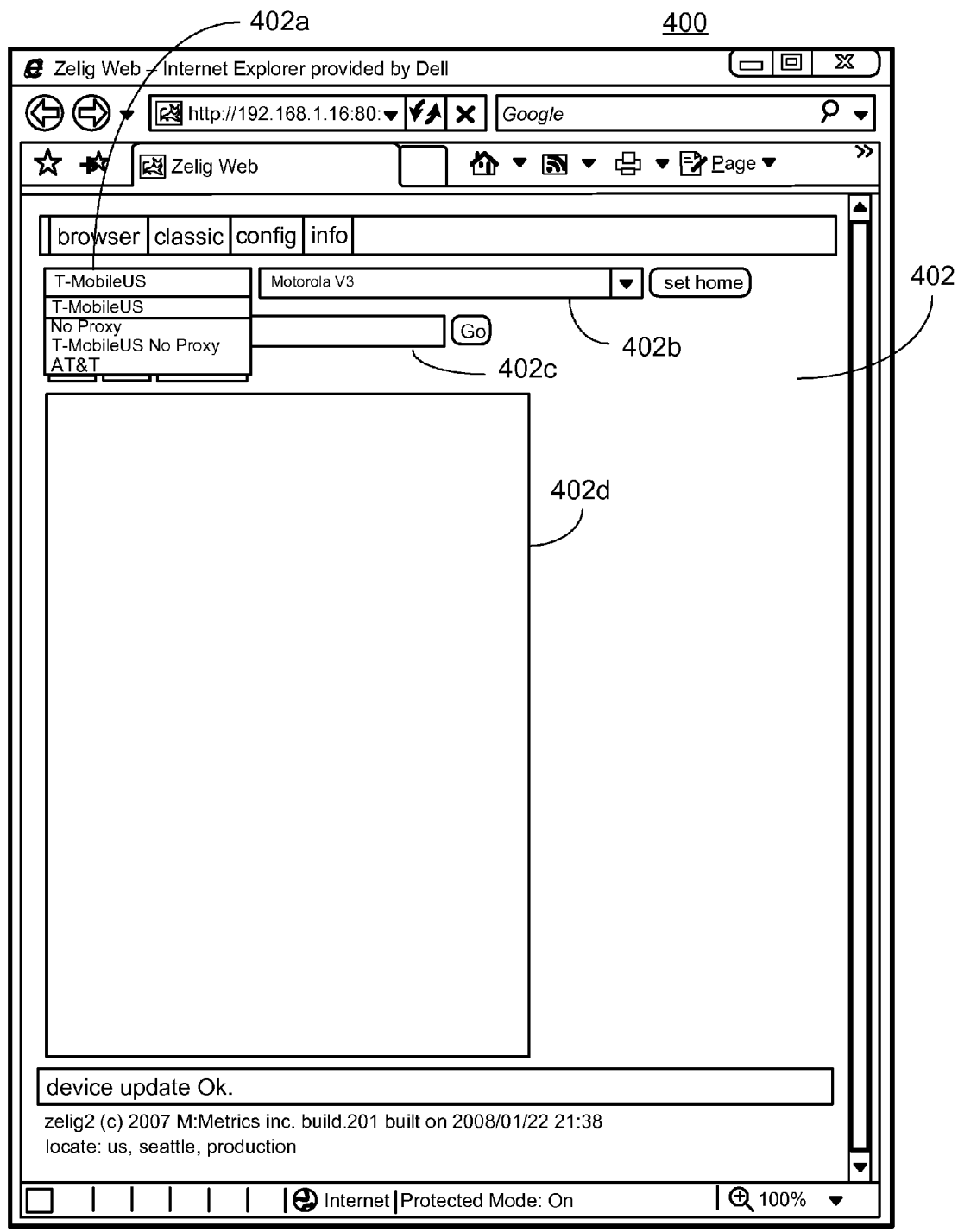
FIGS. 4A and 4B illustrate an example of an interface for a web application.
Figure 4B:
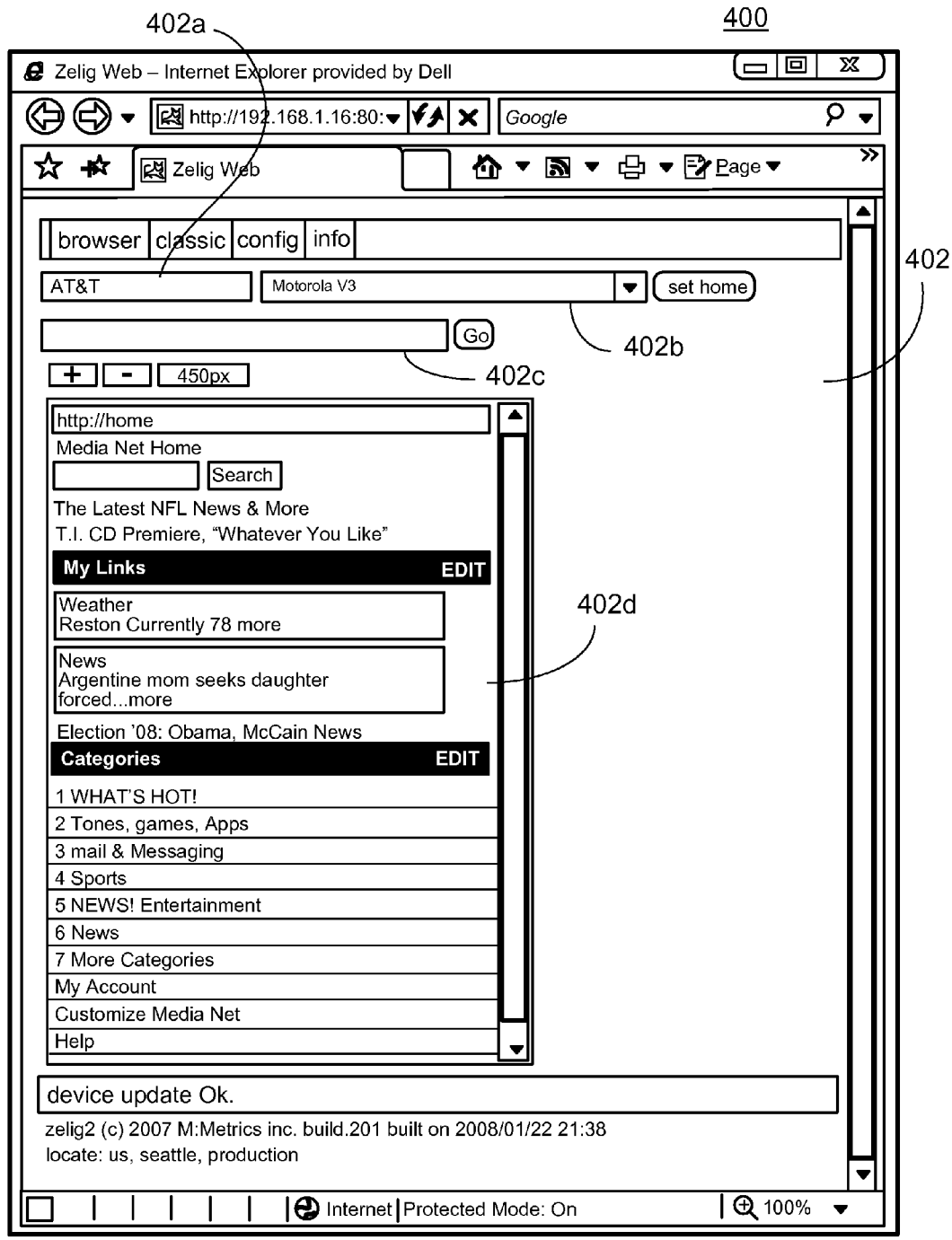

FIGS. 4a and 4b illustrate an example of an interface for a web application, such as the web application provided by staging server 304f. Referring to FIG. 4a, a web browser 400 renders an interface 402 of the web application. The interface 402 includes a selection box 402a that allows a user to select a particular wireless service provider, a selection box 402b that allows the user to select a particular wireless device, and a text box 402c that allows the user to enter or select a URL for the webpage to be retrieved. The interface also includes a display area 402d in which the retrieved webpage is displayed. Referring to FIG. 4b, the interface 402 displays in display area 402d the home page for AT&T as it would be displayed on the Motorola V3 phone.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, or in a computer-readable storage medium. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques are performed in a different order and/or if components in the disclosed systems are combined in a different manner and/or replaced or supplemented by other components. Accordingly, other implementations are within the scope of the following claims.

What is claimed is:

1. A method comprising:
   generating, at an emulation system, a first content request for content to be retrieved over a wireless network, wherein the first content request emulates a content request from a first type of wireless client device;
   sending, from the emulation system, the generated first content request over the wireless network to a first server that is configured to retrieve a first version of the requested content in a first format that is associated with the first type of wireless client device and return the retrieved content to the emulation system;
   receiving, at the emulation system, the first version of the requested content in the first format that is associated with the first type of wireless client device;
   converting the received first version of the requested content from the first format to a third format;
   generating, at the emulation system, a second content request for content to be retrieved over the wireless network, wherein the second content request emulates a content request from a second, different type of wireless client device;
   sending, from the emulation system, the generated second content request over the wireless network to a second server that is configured to retrieve a second version of the requested content in a second format that is associated with the second type of wireless client device and return the retrieved content to the emulation system;
   receiving, at the emulation system and from the wireless network, the second version of the requested content in the second format that is associated with the second type of wireless client device; and
   converting the received second version of the requested content from the second format to the third format.

2. The method of claim 1, wherein:
   generating the first content request for content to be retrieved over the wireless network includes generating a request for a webpage that emulates a request for the webpage from the first type of wireless client device;
   generating the second content request for content to be retrieved over the wireless network includes generating a request for the webpage that emulates a request for the webpage from the second type of wireless client device;
   receiving the first version of the requested content includes receiving a first version of the webpage in a first format that is associated with the first type of wireless client device; and
   receiving the second version of the requested content includes receiving a second version of the webpage in a second format that is associated with the second type of wireless client device.

3. The method of claim 1, wherein the third format to which the received first and second versions of the requested content are converted is compatible with a browser on a client device, and
   further comprising sending the converted first version of the requested content and the converted second version of the requested content to the client device such that it is configured to be displayed by the browser on the client device.

4. The method of claim 1, wherein the received first version of the requested content is visually different than the received second version of the requested content.

5. The method of claim 1 wherein generating the first content request for the content to be retrieved over the wireless network comprises:
   accessing a device database to retrieve information regarding the first type of wireless client device; and
   generating the first content request based on the retrieved information such that the first content request includes information that would be included in a content request from the first type of wireless client device.

6. The method of claim 5 wherein the information that would be included in a content request from the first type of wireless client device includes one or more values for a header in the content request.

7. The method of claim 6 wherein the header includes an accept header or a user agent header.

8. The method of claim 5 wherein the information that would be included in a content request from the first type of wireless client device includes User Agent Profile information.

9. The method of claim 1 wherein sending the generated first content request over the wireless network comprises:
   accessing a network database to retrieve information regarding the wireless network; and
   sending the generated first content request over the wireless network based on the retrieved information.

10. The method of claim 1 further comprising receiving a request at the emulation system, wherein the request indicates content to be retrieved from over the wireless network,
    wherein generating the first content request for content to be retrieved over the wireless network includes generating the first content request to retrieve the content indicated by the request received at the emulation system.

11. The method of claim 10 wherein:
    the emulation system includes an emulation server configured as a proxy server;
    receiving the request at the emulation system includes receiving the request on a port of the emulation server that corresponds to the first type of wireless client; and
    generating, at the emulation system, the first content request includes generating the first content request at the emulation server based on the port on which the request was received.

12. The method of claim 11 wherein:
    the request received at the emulation server is a content request including one or more header values, and
    generating the first content request at the emulation server includes changing the one or more header values to header values that would be in a content request from the first type of wireless client.

13. The method of claim 10 wherein:
    the emulation system includes a staging server and an emulation server coupled to the staging server;
    receiving the request at the emulation system includes receiving the request at the staging server and placing the request in a queue;

generating the first content request includes receiving the queued request at the emulation server from the staging server and generating the first content request at the emulation server;

sending the generated first content request over the wireless network includes sending the generated first content request from the emulation server.

14. The method of claim 10 wherein:

the emulation system includes a staging server and an emulation server coupled to the emulation server;

receiving the request at the emulation system includes receiving the request at the staging server;

generating the first content request includes generating the first content request at the staging server and placing the first content request in a queue; and sending the generated first content request over the wireless network includes receiving the queued first content request at the emulation server from the staging server and sending the generated first content request from the emulation server.

15. The method of claim 14 wherein generating the first content request at the staging server includes forming an HTTP request that includes information that would be included in a content request from the first type of wireless client device.

16. The method of claim 1 wherein the first format is Wireless Markup Language (WML) and the third format is eXtensible HyperText Markup Language (XHTML) such that converting the received first version of the requested content from the first format to the third format includes converting the received first version of the requested content from WML to XHTML.

17. A system comprising:

a client system;

a wireless communication device configured to communicate over a wireless network; and an emulation system coupled to the wireless communication device and configured to:

generate a first content request for content to be retrieved over a wireless network, wherein the first content request emulates a content request from a first type of wireless client device;

send, using the wireless communication device, the generated first content request over the wireless network to a first server that is configured to retrieve a first version of the requested content in a first format that is associated with the first type of wireless client device and return the retrieved content to the emulation system;

receive, from the wireless network, the first version of the requested content in the first format that is associated with the first type of wireless client device;

convert the received first version of the requested content from the first format to a third format;

generate a second content request for content to be retrieved over the wireless network, wherein the second content request emulates a content request from a second, different type of wireless client device;

send, using the wireless communication device, the generated second content request over the wireless network to a second server that is configured to retrieve a second version of the requested content in a second format that is associated with the second type of wireless client device and return the retrieved content to the emulation system;

receive, from the wireless network, the second version of the requested content in the second format that is associated with the second type of wireless client device; and convert the received second version of the requested content from the second format to the third format.

18. The system of claim 17, wherein:

the emulation system being configured to generate the first content request for content to be retrieved over the wireless network includes the emulation system being configured to generate a request for a webpage that emulates a request for the webpage from the first type of wireless client device;

the emulation system being configured to generate the second content request for content to be retrieved over the wireless network includes the emulation system being configured to generate a request for the webpage that emulates a request for the webpage from the second type of wireless client device;

the emulation system being configured to receive the first version of the requested content includes the emulation system being configured to receive a first version of the webpage in a first format that is associated with the first type of wireless client device; and the emulation system being configured to receive the second version of the requested content includes the emulation system being configured to receive a second version of the webpage in a second format that is associated with the second type of wireless client device.

19. The system of claim 17, wherein:

the third format to which the received first and second versions of the requested content are converted is compatible with a browser on the client system, and the emulation system is configured to send the converted first version of the requested content and the converted second version of the requested content to the client device such that it is configured to be displayed by the browser on the client system.

20. The system of claim 17, wherein the received first version of the requested content is visually different than the received second version of the requested content.

21. The system of claim 17 wherein the emulation system being configured to generate the first content request for the content to be retrieved over the wireless network includes the emulation system being configured to:

access a device database to retrieve information regarding the first type of wireless client device; and generate the first content request based on the retrieved information such that the first content request includes information that would be included in a content request from the first type of wireless client device.

22. The system of claim 21 wherein the information that would be included in a content request from the first type of wireless client device includes one or more values for a header in the content request.

23. The system of claim 22 wherein the header includes an accept header or a user agent header.

24. The system of claim 21 wherein the information that would be included in a content request from the first type of wireless client device includes User Agent Profile information.

25. The system of claim 17 wherein the emulation system being configured to send the generated first content request over the wireless network includes the emulation system being configured to:

access a network database to retrieve information regarding the wireless network; and send the generated first content request over the wireless network based on the retrieved information.

26. The system of claim 17 wherein:
the emulation system is configured to receive a request at the emulation system, wherein the request indicates content to be retrieved from over the wireless network, and
wherein the emulation system being configured to generate the first content request for content to be retrieved over the wireless network includes the emulation system being configured to generate the first content request to retrieve the content indicated by the request received at the emulation system.

27. The system of claim 26 wherein:
the emulation system includes an emulation server configured as a proxy server;
the emulation system being configured to receive the request at the emulation system includes the emulation system being configured to receive the request on a port of the emulation server that corresponds to the first type of wireless client; and
the emulation system being configured to generate, at the emulation system, the first content request includes the emulation system being configured to generate the first content request at the emulation server based on the port on which the request was received.

28. The system of claim 27 wherein:
the request received at the emulation server is a content request including one or more header values, and
the emulation system being configured to generate the first content request at the emulation server includes the emulation system being configured to change the one or more header values to header values that would be in a content request from the first type of wireless client.

29. The system of claim 26 wherein:
the emulation system includes a staging server and an emulation server coupled to the staging server;
the emulation system being configured to receive the request at the emulation system includes the emulation system being configured to receive the request at the staging server and placing the request in a queue;
the emulation system being configured to generate the first content request includes the emulation system being configured to receive the queued request at the emulation server from the staging server and generating the first content request at the emulation server;
the emulation system being configured to send the generated first content request over the wireless network includes the emulation system being configured to send the generated first content request from the emulation server.

30. The system of claim 26 wherein:
the emulation system includes a staging server and an emulation server coupled to the emulation server;
the emulation system being configured to receive the request at the emulation system includes the emulation system being configured to receive the request at the staging server;
the emulation system being configured to generate the first content request includes the emulation system being configured to generate the first content request at the staging server and placing the first content request in a queue; and
the emulation system being configured to send the generated first content request over the wireless network includes the emulation system being configured to receive the queued first content request at the emulation server from the staging server and sending the generated first content request from the emulation server.

31. The system of claim 30 wherein the emulation system being configured to generate the first content request at the staging server includes the emulation system being configured to form an HTTP request that includes information that would be included in a content request from the first type of wireless client device.

32. The system of claim 17 wherein the first format is Wireless Markup Language (WML) and the third format is eXtensible HyperText Markup Language (XHTML) such that the emulation system being configured to convert the received first version of the requested content from the first format to the third format includes the emulation system being configured to convert the received first version of the requested content from WML to XHTML.

33. A non-transitory computer-readable medium encoded with a computer program comprising instructions that, when executed, operate to cause a computer to perform operations comprising:
generate, at an emulation system, a first content request for content to be retrieved over a wireless network, wherein the first content request emulates a content request from a first type of wireless client device;
send, from the emulation system, the generated first content request over the wireless network to a first server that is configured to retrieve a first version of the requested content in a first format that is associated with the first type of wireless client device and return the retrieved content to the emulation system;
receive, at the emulation system, the first version of the requested content in the first format that is associated with the first type of wireless client device;
convert the received first version of the requested content from the first format to a third format;
generate, at the emulation system, a second content request for content to be retrieved over the wireless network, wherein the second content request emulates a content request from a second, different type of wireless client device;
send, from the emulation system, the generated second content request over the wireless network to a second server that is configured to retrieve a second version of the requested content in a second format that is associated with the second type of wireless client device and return the retrieved content to the emulation system;
receive, at the emulation system and from the wireless network, the second version of the requested content in the second format that is associated with the second type of wireless client device; and
convert the received second version of the requested content from the second format to the third format.

34. The non-transitory computer-readable medium of claim 33, wherein:
the instructions that, when executed, operate to cause the computer to generate the first content request for content to be retrieved over the wireless network include instructions that, when executed, operate to cause the computer to generate a request for a webpage that emulates a request for the webpage from the first type of wireless client device;
the instructions that, when executed, operate to cause the computer to generate the second content request for content to be retrieved over the wireless network include instructions that, when executed, operate to cause the computer to generate a request for the webpage that emulates a request for the webpage from the second type of wireless client device;

the instructions that, when executed, operate to cause the computer to receive the first version of the requested content include instructions that, when executed, operate to cause the computer to receive a first version of the webpage in a first format that is associated with the first type of wireless client device; and the instructions that, when executed, operate to cause the computer to receive the second version of the requested content include instructions that, when executed, operate to cause the computer to receive a second version of the webpage in a second format that is associated with the second type of wireless client device.

35. The non-transitory computer-readable medium of claim 33, wherein:

the third format to which the received first and second versions of the requested content are converted is compatible with a browser on a client system, and the non-transitory computer-readable medium includes instructions that, when executed, operate to cause the computer to send the converted first version of the requested content and the converted second version of the requested content to the client device such that it is configured to be displayed by the browser on the client system.

36. The non-transitory computer-readable medium of claim 33, wherein the received first version of the requested content is visually different than the received second version of the requested content.

37. The non-transitory computer-readable medium of claim 33 wherein the instructions that, when executed, operate to cause the computer to generate the first content request for the content to be retrieved over the wireless network include instructions that, when executed, operate to cause the computer to:

access a device database to retrieve information regarding the first type of wireless client device; and generate the first content request based on the retrieved information such that the first content request includes information that would be included in a content request from the first type of wireless client device.

38. The non-transitory computer-readable medium of claim 37 wherein the information that would be included in a content request from the first type of wireless client device includes one or more values for a header in the content request.

39. The non-transitory computer-readable medium of claim 38 wherein the header includes an accept header or a user agent header.

40. The non-transitory computer-readable medium of claim 37 wherein the information that would be included in a content request from the first type of wireless client device includes User Agent Profile information.

41. The non-transitory computer-readable medium of claim 33 wherein the instructions that, when executed, operate to cause the computer to send the generated first content request over the wireless network include instructions that, when executed, operate to cause the computer to:

access a network database to retrieve information regarding the wireless network; and send the generated first content request over the wireless network based on the retrieved information.

42. The non-transitory computer-readable medium of claim 33 wherein:

the non-transitory computer-readable medium includes instructions that, when executed, operate to cause the computer to receive a request at the emulation system, wherein the request indicates content to be retrieved from over the wireless network, and wherein the instructions that, when executed, operate to cause the computer to generate the first content request for content to be retrieved over the wireless network include instructions that, when executed, operate to cause the computer to generate the first content request to retrieve the content indicated by the request received at the emulation system.

43. The non-transitory computer-readable medium of claim 42 wherein:

the emulation system includes an emulation server configured as a proxy server;

the instructions that, when executed, operate to cause the computer to receive the request at the emulation system include instructions that, when executed, operate to cause the computer to receive the request on a port of the emulation server that corresponds to the first type of wireless client; and the instructions that, when executed, operate to cause the computer to generate, at the emulation system, the first content request include instructions that, when executed, operate to cause the computer to generate the first content request at the emulation server based on the port on which the request was received.

44. The non-transitory computer-readable medium of claim 43 wherein:

the request received at the emulation server is a content request including one or more header values, and the instructions that, when executed, operate to cause the computer to generate the first content request at the emulation server include instructions that, when executed, operate to cause the computer to change the one or more header values to header values that would be in a content request from the first type of wireless client.

45. The non-transitory computer-readable medium of claim 42 wherein:

the emulation system includes a staging server and an emulation server coupled to the staging server;

the instructions that, when executed, operate to cause the computer to receive the request at the emulation system include instructions that, when executed, operate to cause the computer to receive the request at the staging server and placing the request in a queue;

the instructions that, when executed, operate to cause the computer to generate the first content request include instructions that, when executed, operate to cause the computer to receive the queued request at the emulation server from the staging server and generating the first content request at the emulation server;

the instructions that, when executed, operate to cause the computer to send the generated first content request over the wireless network include instructions that, when executed, operate to cause the computer to send the generated first content request from the emulation server.

46. The non-transitory computer-readable medium of claim 42 wherein:

the emulation system includes a staging server and an emulation server coupled to the emulation server;

the instructions that, when executed, operate to cause the computer to receive the request at the emulation system include instructions that, when executed, operate to cause the computer to receive the request at the staging server;

the instructions that, when executed, operate to cause the computer to generate the first content request include instructions that, when executed, operate to cause the computer to generate the first content request at the staging server and placing the first content request in a queue; and the instructions that, when executed, operate to cause the computer to send the generated first content request over the wireless network include instructions that, when executed, operate to cause the computer to receive the queued first content request at the emulation server from the staging server and sending the generated first content request from the emulation server.

47. The non-transitory computer-readable medium of claim 46 wherein the instructions that, when executed, operate to cause the computer to generate the first content request at the staging server include instructions that, when executed, operate to cause the computer to form an HTTP request that includes information that would be included in a content request from the first type of wireless client device.

48. The non-transitory computer-readable medium of claim 33 wherein the first format is Wireless Markup Language (WML) and the third format is eXtensible HyperText Markup Language (XHTML) such that the instructions that, when executed, operate to cause the computer to convert the received first version of the requested content from the first format to the third format include instructions that, when executed, operate to cause the computer to convert the received first version of the requested content from WML to XHTML.

* * * * *